US008394168B2

(12) United States Patent
Withers et al.

(10) Patent No.: US 8,394,168 B2
(45) Date of Patent: Mar. 12, 2013

(54) LOW COST PROCESS FOR THE MANUFACTURE OF NEAR NET SHAPE TITANIUM BODIES

(75) Inventors: James C. Withers, Tucson, AZ (US); Roger S. Storm, Tucson, AZ (US); Raouf O. Loutfy, Tucson, AZ (US)

(73) Assignee: Materials & Electrochemical Research Corp., Tucson, AZ (US)

( * ) Notice: Subject to any disclaimer, the term of this patent is extended or adjusted under 35 U.S.C. 154(b) by 1008 days.

(21) Appl. No.: 11/344,428

(22) Filed: Jan. 31, 2006

(65) Prior Publication Data
US 2006/0185473 A1    Aug. 24, 2006

Related U.S. Application Data

(60) Provisional application No. 60/647,785, filed on Jan. 31, 2005.

(51) Int. Cl.
C21B 11/10    (2006.01)
C21B 13/12    (2006.01)
C22B 4/00    (2006.01)
C21C 5/52    (2006.01)
C21C 5/54    (2006.01)

(52) U.S. Cl. .................... 75/10.18; 75/10.19
(58) Field of Classification Search ............. 219/121.47; 264/603; 428/610; 75/10.18, 10.19
See application file for complete search history.

(56) References Cited

U.S. PATENT DOCUMENTS

| 2,785,285 A | 3/1957 | Bernard ..................... 219/146 |
| 3,118,053 A | 1/1964 | Arikawa et al. |
| 3,418,446 A | 12/1968 | Claussen |
| 3,834,002 A | 9/1974 | Sissons et al. ............... 29/420.5 |
| 4,311,857 A | 1/1982 | Nagabhushan ............... 564/212 |
| 5,900,207 A * | 5/1999 | Danforth et al. .............. 264/603 |
| 6,046,426 A | 4/2000 | Jeantette .................. 219/121.63 |
| 6,582,833 B2 * | 6/2003 | Toyoda et al. ................ 428/610 |
| 6,680,456 B2 | 1/2004 | Adams ..................... 219/121.47 |
| 2002/0185476 A1 | 12/2002 | Adams ..................... 219/121.47 |

FOREIGN PATENT DOCUMENTS

| GB | 770448 | 3/1957 |
| JP | 03253521 A * | 11/1991 |
| JP | 2003003225 | 1/2003 |
| JP | 2005002356 | 1/2005 |

OTHER PUBLICATIONS

Conley et al.: "Rapid Prototyping and Solid Free Form Fabrication", Transactions of the American Society of Mechanical Engineers, Series B: Journal of Engineering for Industry, ASME. New York, US, vol. 119, No. 4B, Nov. 1997, pp. 811-816.

Carreno-Morelli E et al.: "Solid Free-Form Fabrication of Dense Metallic Parts", Proceedings of the Euro PM, XX, XX, 2005, pp. 61-65.

Javorsky et al.: "Ion Beam Analysis of Plasma Nitrided Ti6A14V-ELI", Nuclear Instruments & Methods in Physics Research, Section-B: Beam Interactions With Materials and Atoms, vol. 175-177, Apr. 2001, pp. 726-731.

(Continued)

*Primary Examiner* — Weiping Zhu
(74) *Attorney, Agent, or Firm* — Hayes Soloway P.C.

(57) ABSTRACT

A process for manufacturing Ti alloy structures using a SFFF manufacturing process with a welding torch as a high energy source, which comprises using as a feed a feed wire made from Ti sponge and alloying powders, or forming a Ti alloy in-situ in the melt.

12 Claims, 5 Drawing Sheets

OTHER PUBLICATIONS

Barreda et al.: "Microstructural Changes in Ti6AL4V Alloy Welds Made Using Electron Beam Welding and Adding Different Thicknesses of Commercial Purity Titanium Sheet", Welding in the World, International Institute of Welding, vol. 45, Jul. 2001, pp. 87-95.

EPO Official Action, Nov. 18, 2008 (3 pgs).

Japanese Office Action (with translation) issued in corresponding application No. 2007-555126, dated Jun. 29, 2012 (6 pgs).

South Korean Official Action with English translation, Appln. No. 10-2007-7017870, dated Aug. 2, 2012 (7 pgs).

Canadian Official Action, Appln. No. 2,600,864, dated Apr. 3, 2012 (4 pgs).

Chinese Official Action, Appln. No. 200680004975.5, dated Oct. 26, 2011, (9 pages).

* cited by examiner

Figure 2 Schematic flow diagram of the mixing of unalloyed Ti particles with a powder of the alloying elements Figure 3 Schematic flow diagram of the mixing of unalloyed Ti particles with a powder of the alloying elements and a ceramic powder Figure 4 Schematic diagram of processing the mixture of powders into a wire from by passing through a series of n rollers and an optional circular reducing die

US 8,394,168 B2

LOW COST PROCESS FOR THE MANUFACTURE OF NEAR NET SHAPE TITANIUM BODIES

CROSS REFERENCE TO RELATED APPLICATION

This invention claims priority to U.S. Provisional Application Ser. No. 60/647,785 filed Jan. 31, 2005.

FIELD OF THE INVENTION

This invention relates to the manufacture of shaped bodies or components formed of titanium (Ti), titanium alloy, and titanium composite materials. The invention has particular utility in the manufacture of shaped bodies or components formed of Ti-6Al-4V (Ti-6-4) alloy and will be described in connection with such utility, although other utilities are contemplated.

BACKGROUND AND PRIOR ART

Titanium components are finding increased importance in both military and commercial applications because of their light weight, excellent mechanical properties, and corrosion resistance. However, conventional manufacturing processes such as investment casting and ram graphite casting result in high cost of near net shape structures. This is due to a combination of factors including material cost, tooling cost, and processing costs including labor costs. In addition castings frequently have defects and voids compromising the mechanical properties of the components. A rapid manufacturing process, also known as solid free form fabrication (SFFF), that uses a laser to melt titanium can deposit 3-dimensional near net shapes, without the need for tooling. However, the capital and operating costs for the laser SFFF process result in component costs substantially higher than either investment or ram graphite casting.

The use of the PTA torch in an SFFF process can produce three dimensional or shaped components at a lower cost than typical Ti alloy manufacturing methods such as investment casting or ram graphite casting. While the PTA-SFFF process can reduce the cost of Ti alloy components compared to available alternatives, conventional PTA-SFFF processes still require the use of relatively expensive titanium alloy wire or powder feeds. Thus, a further cost reduction would be desirable to enable the use of Ti alloys in a broader range of applications. An analysis of the costs of near net shape components produced by the PTA-SFFF process reveals that the single largest cost factor is the cost of the titanium feed which may be powder or wire. The lowest cost form in which Ti can be purchased is in the primary sponge form. However, commercially available Ti sponge does not contain any alloying elements and thus cannot advantageously be used in an SFFF process to produce high strength alloys. Thus, typically either prealloyed powder or prealloyed welding wire is used as feed for the SFFF process. However, the cost of alloyed powders is higher than the cost of welding wire, so the use of wire generally is preferred for a lower cost SFFF process. The cost of pure Ti wire (CP Ti) is lower than that of alloyed Ti wire and one potential route for a cost reduction is to utilize the CP Ti wire with the alloying elements as co-feeds to produce alloys. In fact, there is considerable prior art describing the manufacture of Ti welding wire which contains powders of the desired alloying elements. For example, U.S. Pat. No. 2,785,285 describes filling an elongated circumferentially closed sheath of titanium with the desired alloying powders. Another prior art patent describes a Ti tube filled with compacted alloying powders. However, in all the examples cited, the use of a preformed metal sheath is required. This is a costly process, and while these processes can produce alloyed Ti shapes when used in an SFFF process, there is no economic advantage resulting due to materials costs. U.S. Pat. No. 6,680,456 describes the use of a traditionally formed wire feed for PTA SFFF manufacture of metals including Ti. However, this patented process also suffers from high materials costs.

SUMMARY OF THE INVENTION

The present invention employs a high energy plasma beam such as a welding torch in place of the very expensive laser traditionally used in a SFFF process with relatively low cost titanium feed material by combining the titanium feed and alloying components in a way that considerably reduces the cost of the raw materials. More particularly, in one aspect the present invention employs pure titanium wire (CP Ti) which is lower in cost than alloyed wire, and combines the CP Ti wire with powdered alloying components in-situ in the SFFF process by combining the CP Ti wire and the powder alloying components in the melt of the welding torch or other high power energy beam. In another embodiment, the invention employs titanium sponge material mixed with alloying elements and formed into a wire where it may be used in an SFFF process in combination with a plasma welding torch or other high power energy beam to produce near net shaped titanium components.

BRIEF DESCRIPTION OF THE DRAWINGS

Further features and advantages of the present invention become apparent from the following detailed description taken in conjunction with the accompanying drawings in which like numerals depict like parts, and wherein.

DETAILED DESCRIPTION OF THE PREFERRED EMBODIMENT

The most commonly used Ti alloy is Ti-6Al-4V (Ti-6-4) because of its superior mechanical properties. As a result it is used for the majority of both military and commercial applications. However, Ti and its alloys are expensive and also costly to machine. Representative costs for the manufacture of Ti-6-4 near net shape components based on an arbitrary day price of Ti in mid 2004 for the PTA-SFFF process and other conventional manufacturing processes currently in use and for using lower cost feed materials in accordance with the present invention are shown in Table I below. For the baseline PTA-SFFF manufacturing, a commercially obtained Ti-6-4 welding wire is used as the metal source.

TABLE I

Costs for Near Net Shape Ti-6-4 Components

| Processes | Assumptions | Selling Price/lb in component form | Price/in$^3$ |
|---|---|---|---|
| Ingot | 6" round billet, requires extensive machining | $25/lb[1] | $4 |
| Investment casting | Quote | $70 | $11 |
| Ram graphite casting | Quote | $50-55 | $8-9 |
| Laser SFFF | Powder @ $60/lb with 20% overspray[2] | $129[3] | $21 |
| PTA SFFF[4] | Volume pricing for Ti-6-4 wire @ $23/lb | $38[3] | $6 |
| PTA SFFF | CP Ti wire @ $14/lb plus Al-V powder | $25[3] | $4 |
| PTA SFFF | Mix Ti sponge + Al-V, roll into wire | $16[3,5] | $2.59 |

[1]Cost of fully machined component is typically $100-125/lb.
[2]The overspray in some units can often be 80% and recycle of powder has not been demonstrated to produce acceptable material. This would raise price from $129/lb to $413/lb.
[3]Includes a 20% markup for profit on PTA and laser processing.
[4]PTA SFFF = plasma transferred arc solid free form fabrication
[5]Based on $4.00/lb CP sponge It has been demonstrated that near net shape Ti-6-4 components can be formed in-situ in the laser SFFF process by combining pure Ti powder with pre-alloyed Al—V powder. However, the cost of laser SFFF produced components using the laser power source approach is relatively high. As seen in Table I above, using relatively low cost chemically pure (CP) Ti wire and Al-V pre-alloyed powder with the PTA-SFFF process in accordance with the present invention, permits the manufacture of near net shape Ti-6-4 components at a significantly lower cost.

Figure 1:
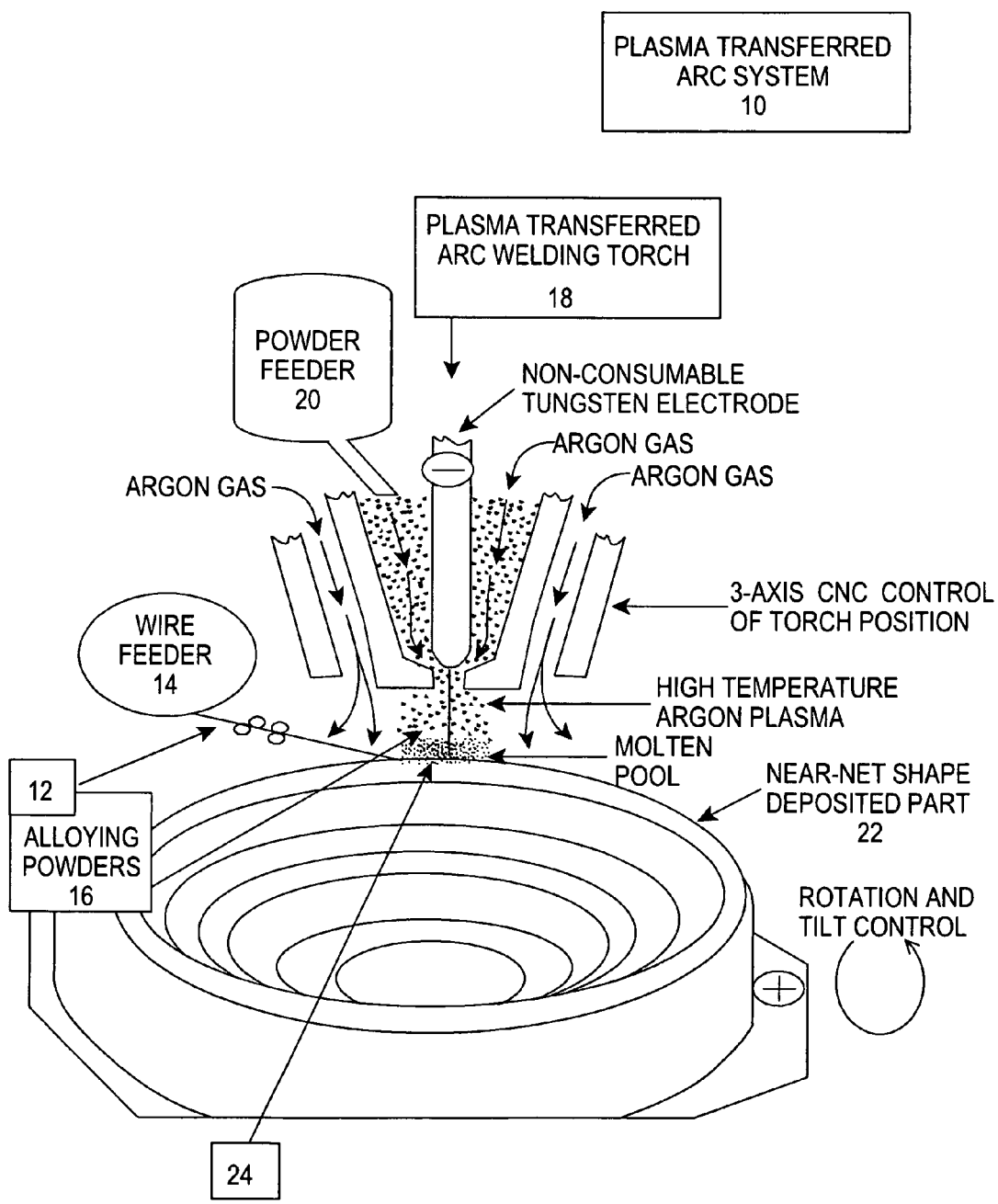
FIG. 1 is a perspective view, in partial cross section, of a PTA-SFFF plasma transferred arc system in accordance with the present invention.
Figure 5:
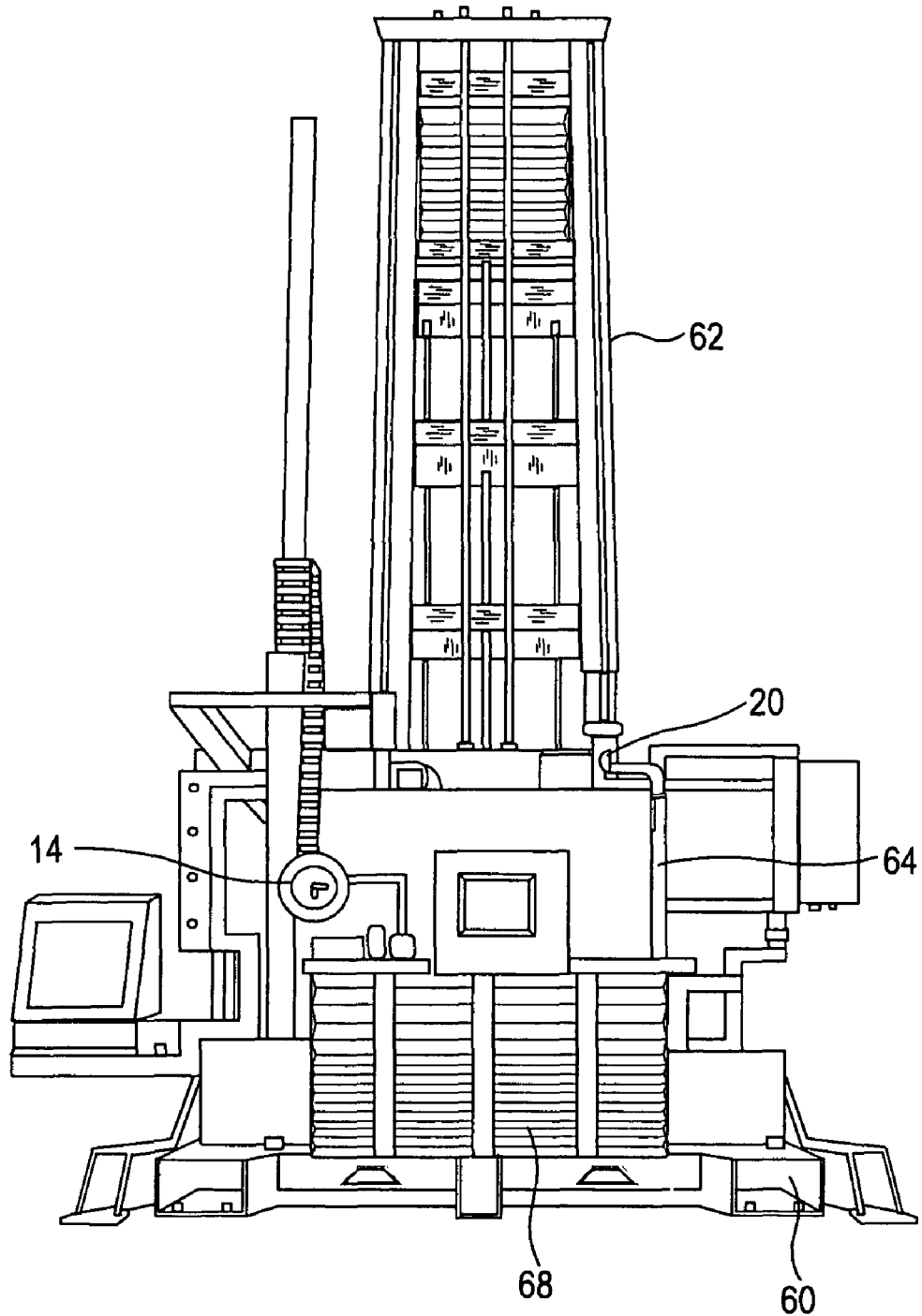
FIG. 5 is commercial plasma transferred arc solid free form fabrication manufacturing equipment which can be used to practice the invention.

Referring to FIGS. 1 and 5, the present invention employs a PTA-SFFF plasma transferred arc system 10 with a relatively low cost titanium feed material. In one aspect of the invention, the titanium feed material comprises pure titanium wire (CP Ti) 12 fed from a wire feeder 14 for combination with a melt of alloying powders 16 exiting from a plasma transfer arc welding torch 18. The powder alloying components are applied to the plasma torch from a feeder 20. The wire feed and the alloying components combine to form a titanium alloy in the melt where they can be deposited on the surface 24 of a target substrate 22.

Referring also to FIG. 5, there is illustrated an apparatus for fabricating three dimensional structures in accordance with the present invention. The apparatus includes a base 60 and frame 62 supporting a closed deposition station 64 incorporating the plasma transferred arc system 10 of FIG. 1. A bellows 68 accommodates movement of the deposition station 64 on the frame 62.

The position of the plasma torch head is controlled by a multi-axis motion controller (not shown) such as a multi-axis CNC controller or a multi-axis robotic controller. The motion of the torch head is controlled so as to deposit three-dimensional structures of the metal alloy on the surface 24 of the target substrate 22. The target substrate also may be rotated and tilted to further control deposition.

Figure 2:
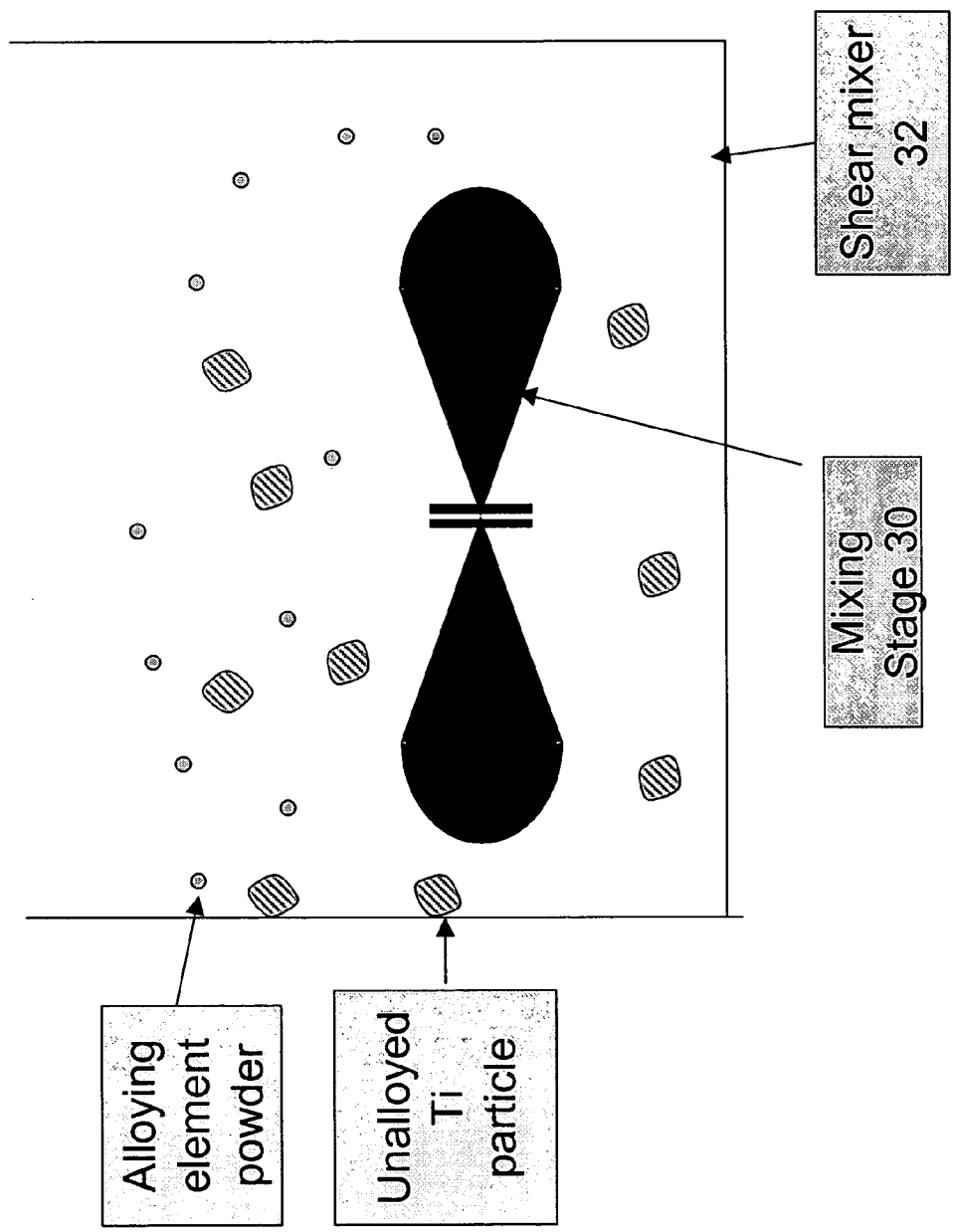
FIG. 2 is a schematic flow diagram of the mixing of unalloyed Ti particles with a powder of the alloying elements.
Figure 3:
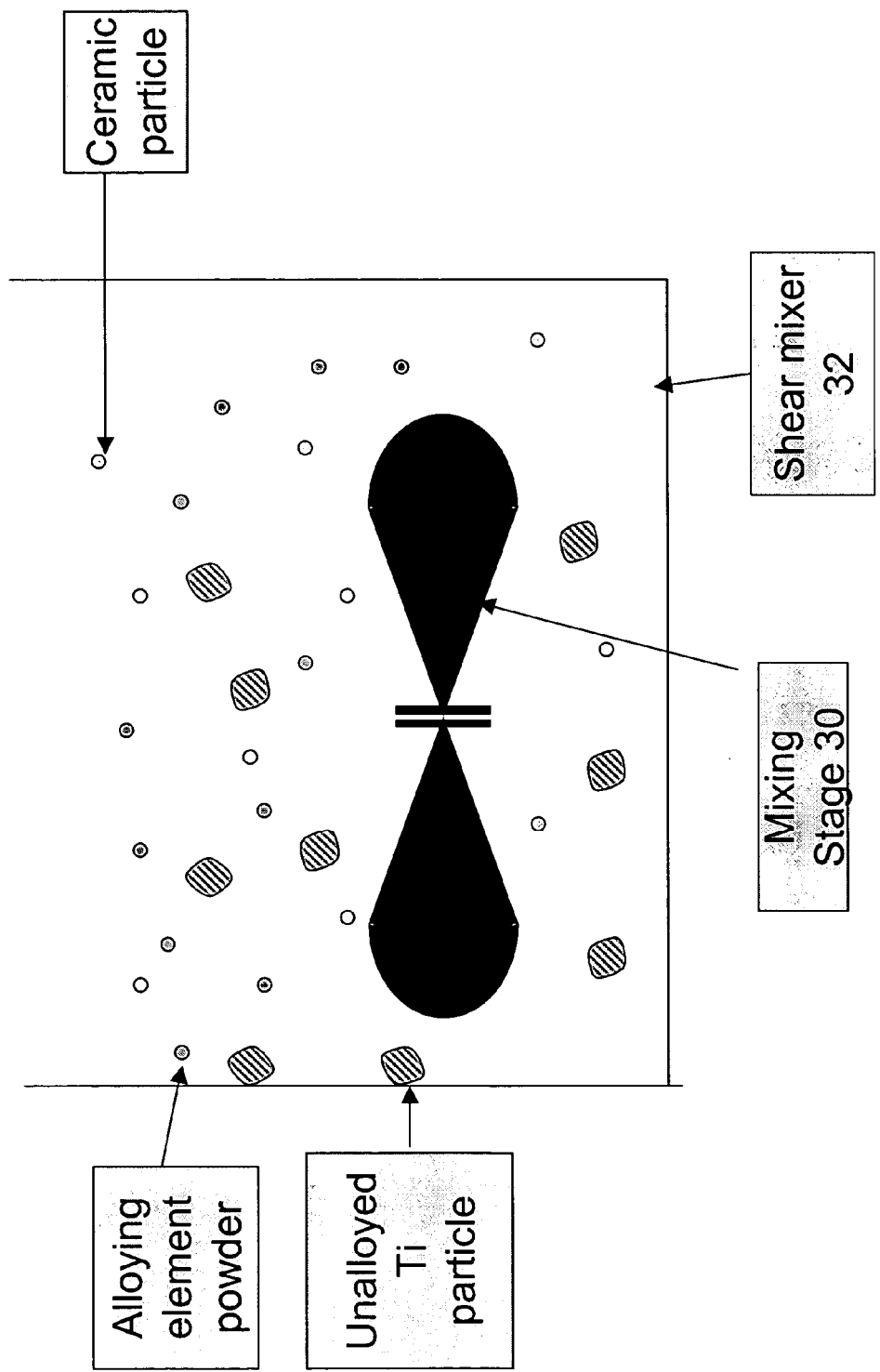
FIG. 3 is a Schematic flow diagram of the mixing of unalloyed Ti particles with a powder of the alloying elements and a ceramic powder.
Figure 4:
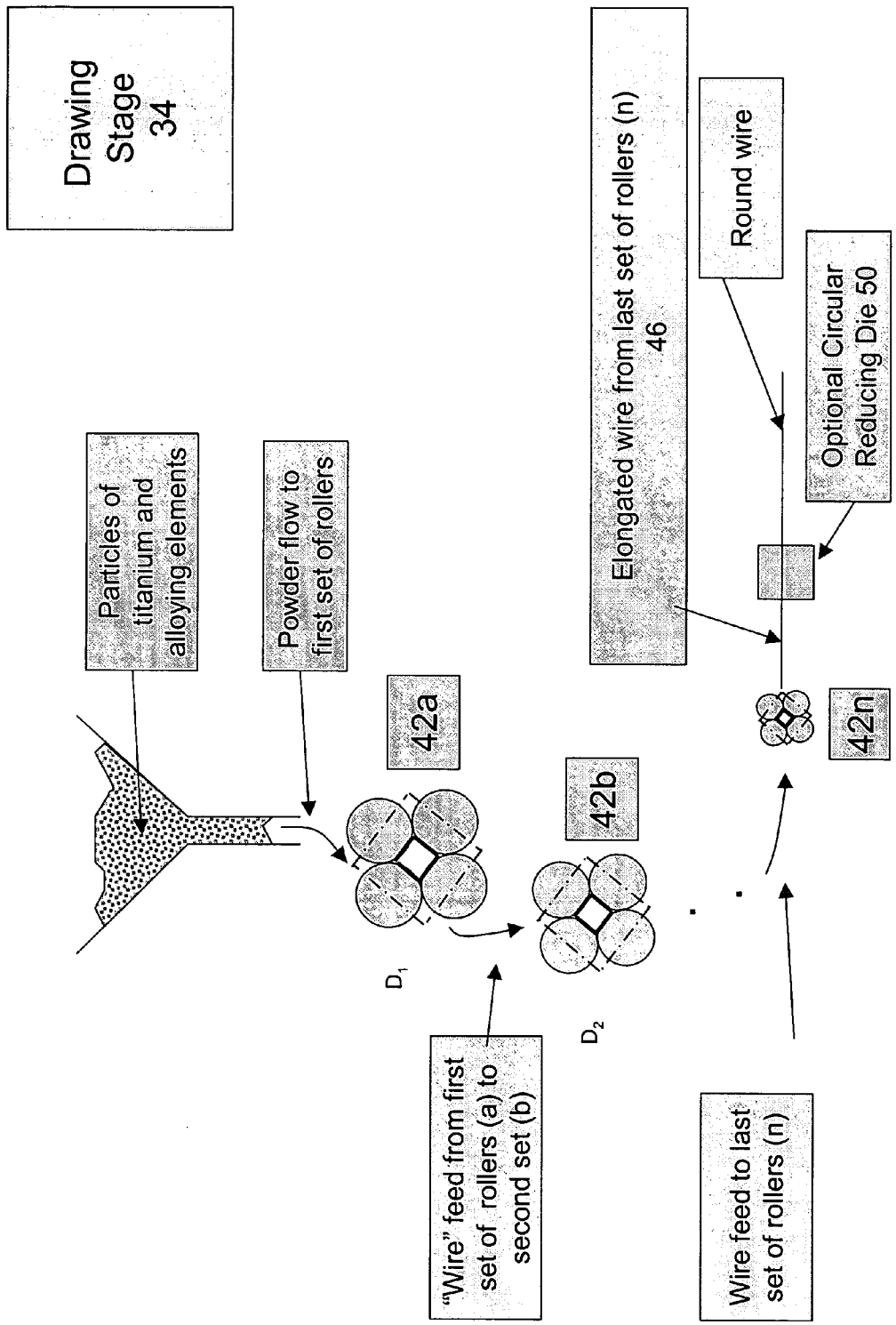
FIG. 4 is a Schematic diagram of processing the mixture of powders into a wire from by passing through a series of n rollers and an optional circular reducing die.

Referring to FIGS. 2-4, in another embodiment, the present invention provides an even greater cost reduction over conventional manufacturing processes currently in use by using the PTA SFFF process with a novel low cost feed wire for the PTA which is a mixture of low cost Ti sponge and Al—V powder. The Al—V powder can be either pre-alloyed or a mixture of the two elemental alloying powders. Referring to FIGS. 2 and 3, the low cost feed wire is produced by first combining and mixing primary Ti sponge material with Al and V powders or Al—V prealloyed powder at a mixing stage 30 in a shear mixer 32 as shown in FIGS. 2 and 3. The ductility of the Ti sponge material is sufficiently high so that it will flow in a shear mixer and mix with the alloying powders.

The Al—V powders or Al—V prealloyed powder is mixed and milled in mixer 32 to a particle size preferably not exceeding about 5 mm. If desired one or more ceramic particles may be included in the wire by adding same in the mixing stage 30 as illustrated in FIG. 3.

Referring also to FIG. 4, the mixed powder is then fed to a drawing stage 34 comprising a series of rollers 42a, 42b . . . 42n in which titanium sponge, which is quite ductile, and the alloying powders are squeezed together with sufficient force to produce an elongate body 46 which, with multiple reductions achieves sufficient strength to be used as a wire feed for a PTA-SFFF system. Each set of rollers 42a, 42b . . . 42n, which can be a set of 3, 4 or more rollers, is of progressively smaller diameters and progressively closer together such that the diameter of the wire is reduced to a target diameter of typically about 0.025" to about 0.125". In the initial set of rollers, there is some degree of non-symmetry of the surface of the wire, as a result of the space between the rollers. However, this non-symmetry is reduced as the wire is passed progressively through finer and finer sets of rollers. Of course, wire non-symmetry also can be reduced by increasing the number of rollers at each stage. The final wire has sufficient dimensional stability and strength so to be able to be fed through a wire feeder into the PTA-SFFF melt pool, where the titanium sponge and Al—V powders alloy to produce Ti-6A-4V or other selected alloy. The wire can also be passed through an optional circular reducing die 50 after it has been processed with the rollers to sufficient strength to withstand the stresses of pulling the wire through the die.

The formation of Ti alloy wire by mixing and rolling is possible because of the inherent high ductility of pure Ti sponge. The ductility of the Ti sponge results in the Ti becoming essentially "self bonded" when squeezed through a series of reducing area rolls, and traps the alloying and ceramic powders. Then when the feed wire is melted by the PTA process, the titanium and trapped powders alloy before solidifying. Thus, the resulting wire may then be employed as a wire feed in a PTA-SFFF process to build near net shape components, i.e., as shown in FIG. 1.

The invention will be further apparent from the following non-limiting working examples.

EXAMPLE 1

CP Ti wire of 0.080" diameter is fed into the PTA torch of a PTA-SFFF apparatus schematically shown in FIG. 1. Simultaneously, pre-alloyed Al—V powder is fed into the PTA torch. The result is that the Ti, Al, and V are instantaneously alloyed in the melt pool generated by the plasma. The pre-mixed Ti-6-4 composition is formed into a 3-dimensional shape with a composition equivalent to Ti-6-4, but at a much lower cost than a cast product. The microstructure of the PTA-SFFF formed material is finer than a cast product as well as being free of defects, which produces properties generally superior to a cast product.

EXAMPLE 2

Pre-alloyed Al—V powder is mixed with Ti sponge as illustrated in FIG. 2. This mixture is formed into a continuous wire by processing through a series of 4 roll mills as illustrated in FIG. 4 that have reducing area between each set of rollers. This formed composite wire is fed into a PTA-SFFF apparatus as shown in FIG. 5 to produce a Ti-6-4 three-dimensional shape with the microstructure, composition, and properties of Ti-6-4, but at a much lower cost.

EXAMPLE 3

Titanium sponge is mixed with elemental vanadium and aluminum powder to produce a Ti-6Al-4V alloy as well as $TiB_2$ powders as illustrated in FIG. 3 in which the $TiB_2$ powders are 10% by volume of the Ti-6Al-4V alloy. The mixture is passed through successive roller compactors as illustrated in FIG. 4 to produce a wire which is fed into the PTA system. A cermet alloy consisting of Ti-6Al-4V/10%(vol)$TiB_2$ is produced in a net shape using the PTA-SFFF apparatus as shown in FIG. 5.

Nanoparticle size ceramic powders can be used to produce a dispersion strengthened titanium alloy or higher quantities of ceramic powder to produce a highly hardened material to serve functions such as ballistic armor. The use of nanoparticles in lower concentration for example ¼ to 2% by volume can produce a much more wear resistant titanium without adversely affecting the ductility of the formed component. Higher strengths can be obtained with addition of particles such as B, TiC and $B_4C$.

The present invention is susceptible to modification. For example, the alloying elements may be added in different ratios. Also alloying elements other than or in addition to Al and V such as Mo, B, Fe, Sn, etc. can be incorporated into the titanium sponge or alloyed with the CP Ti wire to produce virtually any titanium alloy. Ceramic particles such as $TiB_2$, TiN, TiC, $B_4C$, $Y_2O_3$, also can be mixed with the titanium or alloy powders to produce a cermet when melted by the plasma energy source. It also is possible that power sources other than the PTA can be used to melt CP wire or the formed composite titanium feed wire. Examples include: MIG welders, TIG welders, E-beam welders, and even flame torches provided no oxidation or carbonizing of the titanium occurs.

We claim:

1. A process for producing a titanium alloy which comprises mixing ceramic particles, a titanium material consisting of titanium sponge material and selected metallic alloying elements, passing the mixture through compacting rollers to produce a self-bonded wire in which the alloying elements are trapped in compacted titanium sponge material, and feeding the wire to a plasma transferred arc melting process using a non-consumable electrode with a high energy source to produce a titanium alloy containing a dispersion of ceramic particles therein.

2. The process of claim 1, wherein the ceramic particles are nanosize.

3. The process of claim 2, wherein the ceramic particles comprise ¼ to 2% by volume of the mixture.

4. The process of claim 1, wherein the ceramic particles comprise 5 to 30% by volume of the mixture.

5. The process of claim 4, wherein the ceramic particles comprise about 10% by volume of the mixture.

6. The process of claim 1, wherein the ceramic particles comprise a material selected from the group consisting of $TiB_2$, TiN, TiC, $B_4C$ and $Y_2O_3$.

7. The process of claim 3, wherein the ceramic particles interact with the titanium alloy to enhance strength or wear resistance.

8. The process of claim 7, wherein the ceramic particles comprise $B_4C$

9. The process of claim 7, wherein the ceramic particles comprise TiC and B.

10. The process of claim 1, wherein the selected metallic alloying elements comprise a mixture of elemental metallic alloying elements in powder form.

11. The process of claim 10, when the mixture of elemental metallic alloying elements are prealloyed.

12. The process of claim 1, wherein the alloying elements are selected from the group consisting of Al, V, Mo, B, Fe, Sn and a mixture of two or more of said group.

* * * * *